United States Patent Office 3,294,485
Patented Dec. 27, 1966

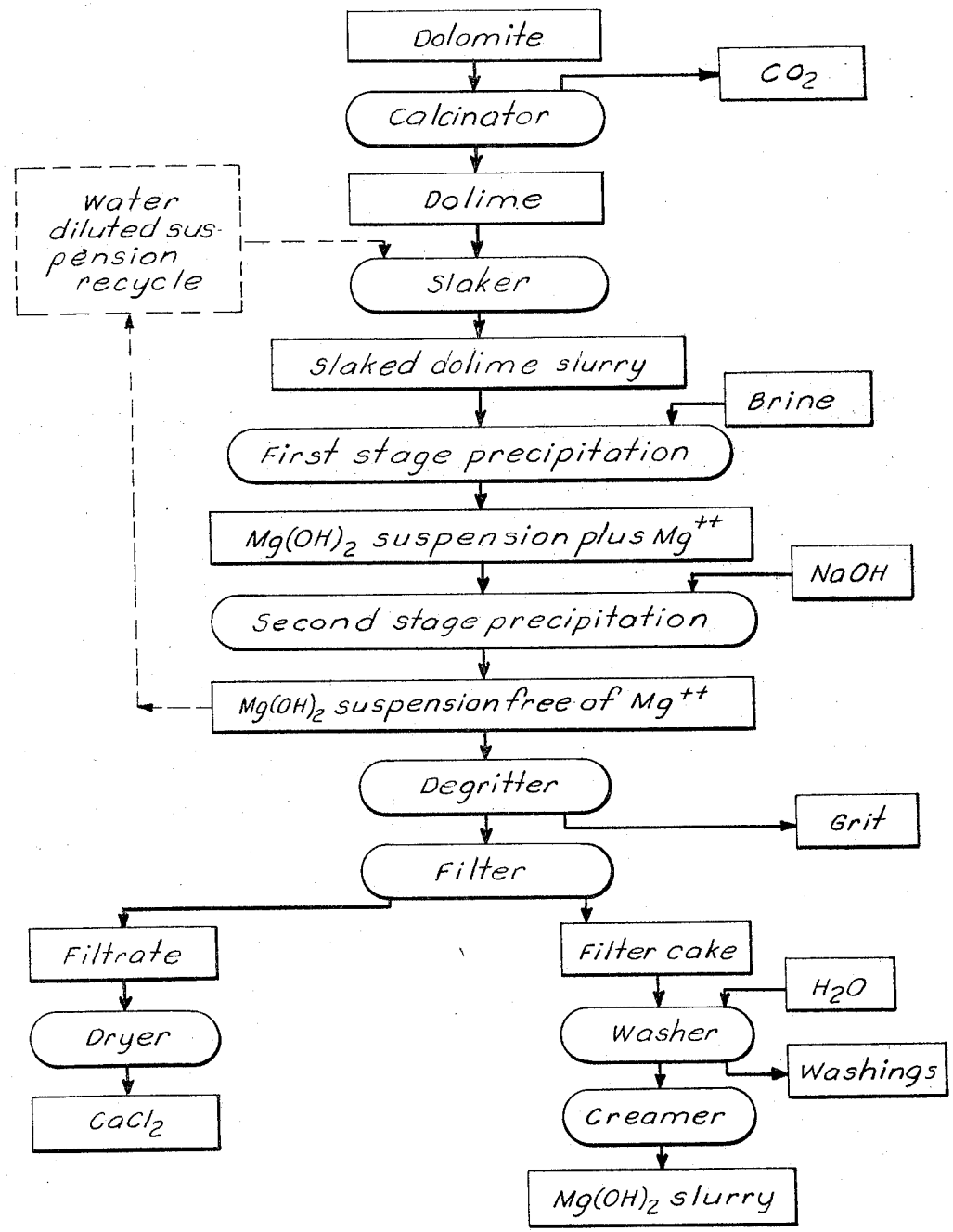

3,294,485
PROCESS FOR PRODUCING MAGNESIUM HYDROXIDE AND A NONCONTAMINATED EFFLUENT SOLUTION
Raymond P. Mayer, Ludington, Mich., assignor to The Dow Chemical Company, Midland, Mich., a corporation of Delaware
Filed Dec. 12, 1963, Ser. No. 330,146
10 Claims. (Cl. 23—90)

This invention relates to magnesium hydroxide and more particularly relates to an improvement in the process wherein dolomitic stone and limestones are employed with aqueous magnesium chloride-containing solutions for producing magnesium hydroxide therefrom along with an effluent solution free of undesirable contamination.

Many processes employing dolomite and alternatively, limestone, for producing magnesium hydroxide from aqueous brines and solutions containing magnesium chloride have been disclosed. Dolomite stone being a substantially equimolar mixture of $MgCO_3$ and $CaCO_3$ is generally preferred in these processes inasmuch as the magnesium values therein can be converted during processing to produce magnesium hydroxide, thereby substantially increasing the yield of product with minimal processing costs.

One such method which is disclosed in U.S. Patent 3,080,215 employing dolomite and magnesium chloride-containing inland brines comprises in general calcining dolomite at a temperature not over 1450° C. to form the oxides, slaking said oxides with a liquid comprising an aqueous calcium chloride solution having a particular specific gravity to produce a slaked dolomitic slurry, referred to as dolime slurry, thereby forming an aqueous mixture of MgO and $Ca(OH)_2$; reacting in a single precipitation the dolime slurry with a brine containing at least about 2 percent by weight $MgCl_2$, using an amount of slurry sufficient to provide an excess of $Ca(OH)_2$ in the reaction mass over the magnesium chloride content introduced, said excess being maintained by establishing a soluble alkalinity control, hereinafter defined, for at least 2 hours at a temperature of between 40° and 90° C., thereby forming a precipitate of magnesium hydroxide suspended in a mother liquor, separating the so-suspended hydroxide from the mother liquor as by filtration to produce filter cake; and water washing said cake to finally produce a high bulk density product especially useful in the production of periclase.

Reference herein to magnesium chloride-containing solutions or brines is to an aqueous medium containing at least about 2 percent magnesium chloride as, for example, naturally occurring inland aqueous solutions, called brines, which contain normally up to about 40 percent by weight of dissolved solids as halide salts of the alkaline earth and alkali metals, the balance being essentially water.

The term "soluble alkalinity" as used herein refers to the number of milliliters of 0.1 N hydrochloric acid needed to titrate, to a phenolphthalein end point, a 100 ml. sample of the solution phase after precipitation therein of magnesium hydroxide.

A number of disadvantages and problems, however, attend the operation of the above process as described. For example, if only a very slight excess of $Ca(OH)_2$ is maintained in a precipitator containing a 20 percent $CaCl_2$ mother liquor, said excess corresponding to a soluble alkalinity of about 4 to 6 mls. a residuum of magnesium ions, calculated as $MgCl_2$, remains in the mother liquor filtrate due to an incomplete precipitation in an amount of from about 600 to 800 parts per million magnesium chloride. Furthermore, when the filtrate is evaporated and the resulting residue dried in order to prepare anhydrous $CaCl_2$, the magnesium chloride in it hydrolyzes to form insoluble MgO which becomes a contaminant in the $CaCl_2$ anhydrous product. As a result aqueous solutions made from the product possess an undesirable cloudy or turbid appearance. In removing the aforesaid residual magnesium chloride content in the mother liquor, for various reasons it having heretofore been though that the mother liquor could not again be reprecipitated in the presence of magnesium hydroxide, a second costly and time consuming distinct precipitation step was required at a higher soluble alkalinity followed by a second additional filtration, including the necessary equipment for so-doing. One such reason is that only at the lower soluble-alkalinity levels aforementioned, does the magnesium hydroxide form a highly filterable precipitate containing a minimum of calcium impurities. On the other hand, if a greater excess of $Ca(OH)_2$ is maintained in the precipitator corresponding to, for example, a soluble alkalinity of from 20 to 24 mls., in attempting to avoid obtaining a residual magnesium ion concentration in the filtrate, and thus contamination by MgO in the anhydrous $CaCl_2$ product, a magnesium hydroxide precipitate forms containing a greater quantity of calcium impurity. This greater quantity of calcium impurity (calculated as percent CaO) may arise from the greater excess of calcium hydroxide.

An object of the present invention, therefore, is to provide an improved process whereby the above described disadvantages and problems attending present dolomitic-brine processes for producing magnesium hydroxide can be overcome.

Other objects and advantages will become apparent when the following detailed specification is read in conjunction with the single figured drawing appended hereto. The drawing represents an embodiment of the present invention illustrated as a flow diagram of the process.

Heretofore, it has been difficult if not impossible to fully overcome the above described problems and disadvantages, thus, out of necessity requiring a compromise in the soluble alkalinity level and conditions under which the process must be operated. An improved process, however, has now been discovered wherein such problems and disadvantages can be substantially completely obviated by performing the precipitation of all the magnesium values in two distinct stages at differing soluble alkalinity levels, without an intervening separation of the precipitate, thereby obtaining an easily filterable precipitate of substantially all the magnesium values present in the source material, thus avoiding any residual magnesium content in the solution separated from the precipitate, sometimes referred to herein as the mother liquor, or calcium chloride brine, with little or no occlusion of impurities in the so-precipitated separated magnesium hydroxide product.

Accordingly, the present invention comprises precipitating in a first stage precipitation substantially all of the magnesium values at a soluble alkalinity sufficient to precipitate the greater portion of the said values. The suspension of precipitated magnesium hydroxide so-obtained is then (without separating the precipitate from the suspension) subjected to a second precipitation step at a greater soluble alkalinity than that used in the first stage. In the second stage the alkalinity is made sufficient to precipitate any residual magnesium content remaining in the solution of the suspension of the first stage. By precipitating in two stages of different soluble alkalinity a readily filterable precipitate forms with surprisingly little or no occlusion of CaO or other impurities notwithstanding the fact that the second precipitation takes place in the presence of magnesium hydroxide already precipitated in the first precipitation step.

More specifically and, referring now to the appended flow diagram which shows an embodiment of the invention employing dolomite, subsequent to calcination and slaking, the slaked dolime or slaked lime and a magnesium chloride-containing brine or solution are separately but concurrently added to a first stage precipitator equipped with a stirring means, the slaked dolomite, or lime, and brine both being introduced at a rate sufficient to continually maintain a soluble alkalinity in said first stage precipitator sufficient to precipitate the greater portion of the magnesium values present, thereby to form a suspension of magnesium hydroxide in a calcium chloride brine. With respect to such a brine solution containing, for example, about 20 percent of calcium chloride, a soluble alkalinity in the first stage precipitator of 4 to 6 mls. has been found suitable.

The so-formed magnesium hydroxide suspension from the first stage precipitation is then introduced into a second stage precipitator and admixed with an amount of either caustic soda (NaOH), slaked dolime, or slaked lime to obtain an increase in the soluble alkalinity therein sufficient to precipitate essentially all of the residual magnesium values remaining in the solution phase of the suspension. At this stage, in a solution or brine containing about 20 percent $CaCl_2$, a soluble alkalinity of from 20 to 24 mls. has been found suitable to precipitate the residual magnesium values.

Following the second precipitation step the second stage suspension is degritted in order to remove impurities originating with the slaked lime or slaked dolime, present in the form of particles larger than those of the magnesium hydroxide precipitate. So-degritted the precipitate is then separated from the solution phase as damp cake as for example by filtration, and washed with water. The product is then ready for use as a wet product or it may be dried if desired to a free flowing powder. For some purposes the wet product may be creamed, that is, mixed with enough water to make a pumpable slurry suitable for transporting as by pipeline to a point of use.

The first stage precipitation is normally carried out at a temperature within the range of from about 25° C. to about 85° C., preferably at about 50° C. to about 70° C. A suitable inventory time of the reactants in the precipitator is from about 2 to about 24 hours, and preferably about 8 to about 15 hours. The term "inventory time" as used herein means the time computed by dividing the volume of the suspension in the precipitation vessel measured in units of volume by the combined rate of flow of brine and alkali solution or slurry measured in the same volume units per hour.

In operating the process of the present invention, employing, for example, an inland brine containing approximately 16 to 18 percent calcium chloride and 8 to 10 percent magnesium chloride, the rate of addition to the precipitator of both reactants, that is, the slaked dolime slurry and the brine, are regulated such that a substantially constant soluble alkalinity level of about 4 to about 6 mls. is maintained in the first stage precipitator. In addition, the size of the first stage precipitator and the rate of withdrawal of the effluent suspension therefrom is such that the liquid level in the precipitator tank is not substantially altered and the desired inventory time is maintained. The suspension produced in the first stage is withdrawn or discharged, usually by overflow, from the precipitator into a second precipitation tank wherein additional alkaline material such as slaked lime or dolime, or caustic soda is added in an amount sufficient to provide and maintain a soluble alkalinity in the second stage precipitator of from about 20 to about 24 mls. This soluble alkalinity level may be obtained by regulating the quantity of, for example, slaked dolime as by adding it at a constant rate to the effluent suspension from the first stage precipitator from which the suspension is withdrawn at a constant rate, the feed rate also being constant. The suspension from the second stage precipitator is removed continuously also at a rate such that the liquid level in the precipitator is not substantially altered. In practice, the addition of an alkaline material in the second stage precipitation as described above may conveniently be accomplished simply by directing the discharge of the first stage precipitator directly to the degritting system, as described above, while injecting into the discharge stream an amount of caustic soda, for example, sufficient to produce and continually maintain a soluble alkalinity in the second stage precipitator of from about 20 to about 24 mls. Due to the relatively small volume of precipitant added in the second stage precipitation compared to that of the first stage, residence time of the reactants in the second stage precipitator need be as a minimum time, that is, for example, only a matter of minutes. Thus, in the case as described above where the first stage precipitator discharge conveyance is used in effect as the second stage precipitator, the residual magnesium values are conveniently removed as the first stage effluent is being transported to filtering pits, as for example, those of a Moore-type filter, thereby saving considerable time and eliminating the need for a separate and distinct second stage precipitation vessel. Normally, the means, such as a pipe, or trough, etc., which is used in conveying the suspension from the first stage to the degritter may be used in effect as a second stage precipitator because it generally will provide sufficient mixing thereof as well as the required residence time. The temperature in the second precipitation stage is generally substantially the same as that in the first stage due to the close proximity in said precipitation stages with respect to time once the process is operating on a continuous basis.

During the second stage precipitation, the residual magnesium values are reduced in concentration from a range of between about 600 and 800 p.p.m., as they exist in the first stage precipitator effluent, to a range of between about 20 and 30 p.p.m. in the second stage effluent. There is thereby obtained a second stage precipitator effluent which, because of its freedom from residual magnesium ions, cannot only be recycled for use in slaking the aforementioned lime or dolime, as shown by dotted lines, but also as described below, is particularly suitable for production of anhydrous $CaCl_2$.

The filtrate from the second stage, being essentially free of residual magnesium values, may be sent to calcium chloride dryers for recovery of high grade calcium chloride therefrom, particularly anhydrous calcium chloride, without the attending troublesome and undesirable effects heretofore encountered, as described above, due to the presence of residual magnesium values in the filtrate. A particularly suitable method of recovering calcium chloride from such a filtrate is that disclosed in U.S. Patent 2,646,343. In so doing the alkali metal halides (e.g. NaCl, KCl) are usually removed by crystallization techniques well known in the art during the stages of concentration prior to charging the filtrate into the dryers.

For convenience, the flow rate of the various reactants into both the first and second stage precipitators in order to maintain a soluble alkalinity within the aforementioned ranges may be controlled, after calibration based on the soluble alkalinity desired, by pH meters rather than constantly determining the soluble alkalinity level by successive manual titrations of 100 ml. samples of the solutions sought to be controlled.

In order to illustrate the present invention and show that the removal of above described residual magnesium chloride content from the initial magnesium hydroxide precipitator effluent is achieved without first having to remove the suspended magnesium hydroxide product therefrom, thus eliminating a costly and time consuming second filtration step, and without impairing in any way the quality and quantity of said product normally obtainable, the following example is given which is not intended to be construed as limiting the invention thereto.

EXAMPLE 1

Magnesium hydroxide was precipitated in a vessel equipped with stirring means at a soluble alkalinity of from 4 to about 6 mls. by introducing into the vessel separately but concurrently both slaked dolime slurry and an inland brine having a specific gravity of about 1.278 and comprising about 17.25 percent calcium chloride, about 9.48 percent magnesium chloride and about 2.95 percent sodium chloride, the balance except for minor amounts of other salts being water. The dolime of the slurry had been calcined at a temperature of about 1400° C. and thereafter slaked and slurried with a slaking solution at a temperature of about 70° C. for about 0.5 hour. The slaking solution was a quantity of the suspension from the initial precipitator diluted with water to produce a calcium chloride liquor concentration of 10 percent to give, when mixed with the calcined dolime to be slaked, a resulting slaked dolime slurry containing about 1.29 pounds of dolime per gallon of slurry. In the precipitation of the magnesium hydroxide from the inland brine about 0.79 gallon of the so-prepared slaked dolime slurry was used per gallon of the inland brine. The rates were such that an inventory time of 12 hours was obtained. These proportions maintained at 4 to 6 ml. soluble alkalinity during the precipitation. The concurrent addition of the slurry and brine to the precipitator resulted in a magnesium hydroxide suspension, containing 0.87 pound of the hydroxide per gallon. Thereafter the grits were removed from the magnesium hydroxide suspension by passing the suspension through a 6 inch hydraulic cyclone separator. The so-degritted suspension was then split into two effluent streams for comparative purposes, one designated A and the other B.

As a blank for comparison the precipitated magnesium hydroxide from effluent stream A was separated from the calcium chloride liquor by use of a Büchner funnel to form a one inch thick filter cake at a rate indicated in Table I below (in commercial operation, a Moore filter is often used). The calcium chloride liquor obtained from the filtration was tested and found to contain about a 600 p.p.m. residual dissolved magnesium chloride. Subsequently this filtrate was again subjected to precipitation in an agitated precipitator, with a 10 hour inventory time, by concurrently adding a slurry of slaked lime thereto, said slurry containing about 1.40 pounds of slaked lime to 1 gallon to slurry thereby providing a soluble alkalinity of from about 20 to 24 mls. A ratio of about 0.007 gallon of the lime slurry per gallon of the filtrate was required to maintain this soluble alkalinity. Pursuant to this treatment an additional amount of precipitated magnesium hydroxide (about 0.003 lb./gal.) was obtained and removed from the resulting solution by filtration. The filtrate after the second precipitation was found, as indicated in Table I, to contain about 20 to 22 p.p.m. residual magnesium chloride.

For comparison with the blank and in accordance with the invention, effluent stream B was not filtered to remove the magnesium hydroxide therefrom, but rather was treated with a quantity of slaked dolime slurry in a second stage agitated precipitator, using the same calcium hydroxide-to-magnesium chloride ratio as that employed in subjecting effluent stream A to a second precipitation after the initial precipitation of magnesium hydroxide had been removed by filtration therefrom, to give a soluble alkalinity of from about 20 to about 24 mls. at a temperature of about 51° C. with an inventory time of about 0.5 hour. The total quantity of magnesium hydroxide present was then separated from its mother liquor and washed, the filter rates, magnesium hydroxide product assay and final mother liquor assay being given in Table I below.

TABLE I

|  | Sample 1 | | Sample 2 | |
| --- | --- | --- | --- | --- |
|  | A | B | A | B |
| Filter Rates (at 24″ Hg vacuum): | | | | |
| Loading, gal./hr./ft.² | 10.3 | 9.4 | 8.1 | 8.9 |
| Washing, gal./hr./ft.² | 9.5 | 7.4 | 5.8 | 8.5 |
| Magnesium Hydroxide Assay (Washed, Wet): | | | | |
| Percent Mg(OH)₂ | 56.2 | 57.4 | 58.6 | 58.6 |
| Percent CaO | 0.16 | 0.18 | 0.17 | 0.18 |
| Percent Cl | 0.07 | 0.06 | 0.07 | 0.07 |
| Calcium Chloride Liquor Assay (Before Second Precipitation): | | | | |
| Specific Gravity, 25° C./4° C. | 1.210 | | 1.215 | |
| Percent CaCl₂ | 20.4 | | 20.9 | |
| Soluble Alkalinity, ml | 4.62 | | 4.78 | |
| P. p.m. MgCl₂ | 600 | | 600 | |
| Calcium Chloride Liquor Assay (After Second Precipitation): | | | | |
| Specific Gravity, 25° C./4° C. | 1.210 | 1.215 | 1.210 | 1.220 |
| Percent CaCl₂ | 20.4 | 20.9 | 20.4 | 21.3 |
| Soluble Alkalinity, ml | 22.0 | 21.4 | 22.0 | 24.0 |
| P.p.m. MgCl₂ | 20 | 22 | 20 | 14 |

From the results given in Table I it is clear that a high quality magnesium hydroxide precipitate product can be produced by the process of the present invention employing a double precipitation but only one filtration step. The process also generates a filtrate essentially free of any residual magnesium values, and is thus useable as a source from which to recover high quality anhydrous calcium chloride without encountering the problems discussed above with respect to drying said filtrate to a substantially dewatered form, as in making anhydrous calcium chloride.

It is manifest that various changes and modifications can be made in the present invention without departing from the spirit or scope thereof and it is understood that I limit myself only as defined in the claims appended hereto.

I claim:
1. In a method of producing magnesium hydroxide and a non-contaminated calcium chloride effluent solution from an aqueous solution containing magnesium chloride, the steps which comprise, slaking a form of quick lime selected from the group consisting of calcined lime and dolime, reacting said slaked lime in a first stage precipitation with said aqueous solution containing magnesium chloride in an amount such that a slight excess of Ca(OH)₂ is maintained corresponding to a soluble alkalinity of from about 4 to about 6 mls., thereby forming a suspension comprising magnesium hydroxide as a first stage precipitate suspended in a solution containing calcium chloride and residual unprecipitated magnesium values, treating the suspension so-produced in a second stage precipitation with an amount of an alkaline precipitant corresponding to a soluble alkalinity of from about 20 to about 24 mls., selected from the group of slaked dolime, slaked lime, and NaOH, sufficient to precipitate the residual magnesium values as magnesium hydroxide, and separating the magnesium hydroxide precipitated in both stages from the resulting solution.

2. The method of claim 1 wherein the temperature of the first stage precipitation is within the range of from about 25° C. to about 85° C. and the inventory time is from about 2 to 24 hours.

3. The method of claim 1 wherein the second stage precipitation is accomplished in a first stage precipitator discharge conveyance used to convey the suspension from said first stage precipitator.

4. The method of claim 3 wherein the discharge conveyance is a pipe.

5. The method of claim 3 wherein sodium hydroxide is used as the selected alkaline precipitant in the second stage precipitation.

6. In a method of producing magnesium hydroxide from an aqueous brine consisting essentially of from 16 to 18 percent by weight calcium chloride and 8 to 10 percent magnesium chloride, the balance being water and minor amounts of other halide salts, the steps which comprise, slaking a form of quick lime selected from the group consisting of calcined lime and dolime with a slaking solution containing about 10 percent by weight calcium chloride, reacting said selected slaked quick lime with said aqueous brine at a temperature within the range of from about 25 to about 85° C. in a first stage precipitation at a soluble alkalinity of from about 4 to 6 milliliters, inclusive, thereby to form a suspension of first stage magnesium hydroxide precipitate in an aqueous calcium chloride mother liquor containing unprecipitated magnesium values, treating the suspension so-formed in a second stage precipitation at a soluble alkalinity of from about 20 to 24 milliliters, inclusive, with an alkaline precipitant to precipitate the residual magnesium values as second stage magnesium hydroxide precipitate, and separating the magnesium hydroxide precipitated in both stages from the mother liquor.

7. The process of claim 6 wherein the temperature in the first stage precipitation is within the range of from about 50° C. to about 70° C.

8. The process of claim 6 wherein the alkaline precipitant used in the second stage precipitation is one selected from the group consisting of slaked dolime, slacked lime, and sodium hydroxide.

9. The method of claim 6 wherein the second stage precipitation is accomplished in a first stage precipitator discharge conveyance used to convey the suspension from said first stage precipitation.

10. The method of claim 1, wherein the concentration of the magnesium chloride containing brine solution is at least 2 percent and the suspension solution contains about 20 percent $CaCl_2$.

References Cited by the Examiner
UNITED STATES PATENTS

| | | | |
|---|---|---|---|
| 1,505,202 | 8/1924 | Judd | 23—201 |
| 1,875,070 | 8/1932 | Martin | 23—90 |
| 2,373,913 | 4/1945 | Pike | 23—201 X |
| 2,479,138 | 8/1949 | Scoles | 23—201 |
| 2,892,683 | 6/1959 | Veronica | 23—201 |
| 2,940,831 | 6/1960 | Nossardi et al. | 23—201 |
| 3,007,776 | 11/1961 | Periard | 23—201 |
| 3,033,650 | 5/1962 | Sable | 23—201 |
| 3,080,215 | 3/1963 | Waldron et al. | 23—201 |
| 3,111,376 | 11/1963 | Patton et al. | 23—201 |
| 3,127,241 | 3/1964 | Periard et al. | 23—201 |

FOREIGN PATENTS

| | | |
|---|---|---|
| 890,257 | 2/1962 | Great Britain. |
| 917,395 | 2/1963 | Great Britain. |

MILTON WEISSMAN, *Primary Examiner.*

EDWARD STERN, OSCAR R. VERTIZ, *Examiners.*